(12) United States Patent
Haans et al.

(10) Patent No.: US 8,475,129 B2
(45) Date of Patent: Jul. 2, 2013

(54) SYSTEMS AND METHODS FOR ASSEMBLING AN AIR DISTRIBUTION SYSTEM FOR USE IN A ROTOR BLADE OF A WIND TURBINE

(75) Inventors: Wouter Haans, The Hague (NL); Jacob Johannes Nies, Zwolle (NL); Ciro Cerretelli, Maderno (IT)

(73) Assignee: General Electric Company, Schenectady, NY (US)

( * ) Notice: Subject to any disclaimer, the term of this patent is extended or adjusted under 35 U.S.C. 154(b) by 873 days.

(21) Appl. No.: 12/635,573

(22) Filed: Dec. 10, 2009

(65) Prior Publication Data
US 2011/0142633 A1    Jun. 16, 2011

(51) Int. Cl.
*F01D 5/18*    (2006.01)
(52) U.S. Cl.
USPC ............... 416/90 R; 415/914; 416/1; 416/91
(58) Field of Classification Search
USPC ............. 415/905, 914; 416/1, 90 R, 91, 92, 416/90 A, 20 R
See application file for complete search history.

(56) References Cited

U.S. PATENT DOCUMENTS

| | | | |
|---|---|---|---|
| 4,692,095 A | 9/1987 | Lawson-Tancred | |
| 6,629,674 B1 | 10/2003 | Saddoughi et al. | |
| 6,940,185 B2 | 9/2005 | Andersen et al. | |
| 7,387,491 B2 | 6/2008 | Saddoughi et al. | |
| 7,582,977 B1 | 9/2009 | Dehlsen | |
| 2010/0143123 A1* | 6/2010 | Haans et al. | 416/1 |

FOREIGN PATENT DOCUMENTS

| | | |
|---|---|---|
| EP | 1517033 A1 | 3/2005 |
| GB | 2186033 A | 8/1987 |
| WO | 2004092577 A1 | 10/2004 |
| WO | 2008080407 A1 | 7/2008 |

OTHER PUBLICATIONS

David F. Fisher & Michael C. Fischer, "Development Flight Tests of Jetstar LFC Leading-Edge Flight Test Experiment," available at http://ntrs.nasa.gov/archive/nasa/casi.ntrs.nasa.gov/19900003193_1990003193.pdf, (last visited Oct. 27, 2009).
Gustave P. Corten & Herman F. Veldkamp, "Insects Can Halve Wind-Turbine Power," 412 Nature, 42-43 (2001).
Albert L. Braslow, "A History of Suction-Type Laminar-Flow Control with Emphasis on Flight Research," Monographs in Aerospace History, No. 13 (1999).

* cited by examiner

*Primary Examiner* — Dwayne J White
(74) *Attorney, Agent, or Firm* — James McGinness, Esq.; Armstrong Teasdale LLP

(57) ABSTRACT

A method of assembling an air distribution system for use in a rotor blade of a wind turbine. The rotor blade includes a sidewall at least partially defining a cavity extending from a blade root towards a blade tip. The method includes positioning at least a portion of a manifold within the cavity and coupling the manifold to the sidewall. The manifold extends from the blade root towards the blade tip and has a root end and an opposing tip end. A passage is defined from the root end to the tip end. A flow control device is coupled to the manifold root end and configured to channel air through the manifold. A bypass flow assembly is coupled to the manifold and configured to channel air through the air distribution system with the flow control device in a non-operating configuration.

21 Claims, 6 Drawing Sheets

SYSTEMS AND METHODS FOR ASSEMBLING AN AIR DISTRIBUTION SYSTEM FOR USE IN A ROTOR BLADE OF A WIND TURBINE

BACKGROUND OF THE INVENTION

The embodiments described herein relate generally to methods and systems for operating a wind turbine having an active flow control system and, more particularly, to methods and systems for operating an air distribution system during periods of electrical power loss.

Active Flow Control (AFC) is a general term for technologies and/or systems that actively attempt to influence an aerodynamic response of an object in reaction to given in-flow conditions. More specifically, at least some known AFC systems are used to manipulate flow conditions across a blade. As used herein, the term "airfoil" refers to a turbine blade, a wing, and/or any other suitably airfoil. In contrast to known passive flow control systems that provide substantially constant flow control, known AFC systems enable flow control to be selectively applied to an airfoil. At least some known AFC systems use air distribution systems to manipulate a boundary layer of air flowing across a surface of an airfoil.

At least some known AFC systems require power to operate a flow control device to drive air through the air distribution systems. During an event of power loss, AFC systems may not be able to operate. The power loss event may include power grid loss, malfunctioning of the turbine electrical system, and/or failure of the AFC air distribution system. Failure of the AFC air distribution system includes failure of the AFC flow control device electrical system, control system, and/or mechanical system. The power loss event may lead to turbine blade overspeed, during which the AFC system may not be available. Known AFC systems include a fail-safe or safe-life AFC air distribution system to compensate for periods of electrical power loss.

Accordingly, it is desirable to provide a method and/or apparatus capable of operating the AFC system during periods of electrical power loss.

BRIEF DESCRIPTION OF THE INVENTION

In one aspect, a method of assembling an air distribution system for use in a rotor blade of a wind turbine is provided. The rotor blade includes a sidewall at least partially defining a cavity extending from a blade root towards a blade tip. The method includes coupling the manifold to the sidewall, wherein the manifold extends from the blade root towards the blade tip and has a root end and an opposing tip end. The manifold defines a passage from the root end to the tip end. A flow control device is coupled to the manifold root end and is configured to channel air through the manifold. A plurality of apertures is defined through the manifold and the sidewall. The plurality of apertures provides flow communication between the passage and ambient air. A bypass flow assembly is coupled to the manifold and is configured to channel air through the air distribution system with the flow control device in a non-operating configuration.

In another aspect, an air distribution system for use in a wind turbine is provided. The wind turbine includes a rotor blade having a sidewall at least partially defining a cavity extending from a blade root towards a blade tip of the rotor blade. The air distribution system includes a manifold at least partially positioned within the cavity and extending from the blade root towards the blade tip. The manifold has a root end and an opposing tip end and defines a passage from the root end to the tip end. A flow control device is operatively coupled to the manifold and configured to channel air into the manifold. A plurality of apertures is defined through the manifold and the sidewall. The plurality of apertures provides flow communication between the passage and ambient air. A bypass flow assembly is operatively coupled to the manifold and is configured to channel air through the air distribution system with the flow control device in a non-operating configuration.

In yet another aspect, a wind turbine is provided. The wind turbine includes at least one rotor blade and an air distribution system. The rotor blade includes a sidewall at least partially defining a cavity extending from a blade root towards a blade tip. The air distribution system is at least partially positioned within the cavity and includes a manifold at least partially positioned within the cavity and extending from the blade root towards the blade tip. The manifold has a root end and an opposing tip end, and defines a passage from the root end to the tip end. A flow control device is operatively coupled to the manifold and configured to channel air into the manifold. A plurality of apertures is defined through the manifold and the sidewall. The plurality of apertures provides flow communication between the passage and ambient air. A bypass flow assembly is operatively coupled to the manifold and is configured to channel air through the air distribution system with the flow control device in a non-operating configuration.

By including a bypass flow assembly, the embodiments described herein facilitate operation of an active flow control system within a rotor blade of a wind turbine. More specifically, the bypass flow assembly provides a supply of air to the AFC system when a power loss event that results in a failure of the AFC flow control device has occurred.

BRIEF DESCRIPTION OF THE DRAWINGS

FIG. 1 is a perspective view of an exemplary wind turbine.

FIG. 2 is a partial view of the wind turbine shown in FIG. 1 including an exemplary flow control system.

FIG. 3 is a partial view of an exemplary air distribution system suitable for use with the wind turbine in FIG. 1.

FIG. 4 is a graph of exemplary traces of the pressure ratio created by the centrifugal forces generated by the rotation of a blade suitable for use with the wind turbine in FIG. 1.

FIG. 5 is a graph of exemplary traces of a pressure ratio, $P_r$, versus a span wise position along an axis of a blade suitable for use with the wind turbine in FIG. 1.

FIG. 6 is a partial view of an alternative embodiment of an air distribution system suitable for use with the wind turbine in FIG. 1.

FIG. 7 is a flow chart illustrating an exemplary method for assembling an air distribution system suitable for use with the wind turbine in FIG. 1.

DETAILED DESCRIPTION OF THE INVENTION

The embodiments described herein include an active flow control (AFC) system that ejects air through surface apertures and/or perforations to facilitate controlling flow separation on an airfoil, such as a wind turbine blade. The methods and systems described herein facilitate the operation of the AFC system during a loss of power. More specifically, the embodiments described herein enable the centrifugal force resulting from the rotation of the wind turbine blade to operate the AFC system during periods of power loss or equipment malfunction. In one embodiment, a lift increasing air distribution system is provided that includes a bypass flow assembly configured to utilize the centrifugal force generated by the rotation of the blade to discharge fluid though the air distribution system, thereby reducing the potential loss of power generation capability of the wind turbine during a failure of the AFC system. In an alternative embodiment, a lift decreasing air distribution system is provided with a bypass flow assembly configured to discharge fluid across an airfoil to decrease a lift across the airfoil during periods of turbine overspeed and/or any other power loss event that demands a decrease in rotor torque. As used herein, the term "overspeed" refers to a turbine rotational speed at which potential damage to the turbine blade may occur.

Figure 1:
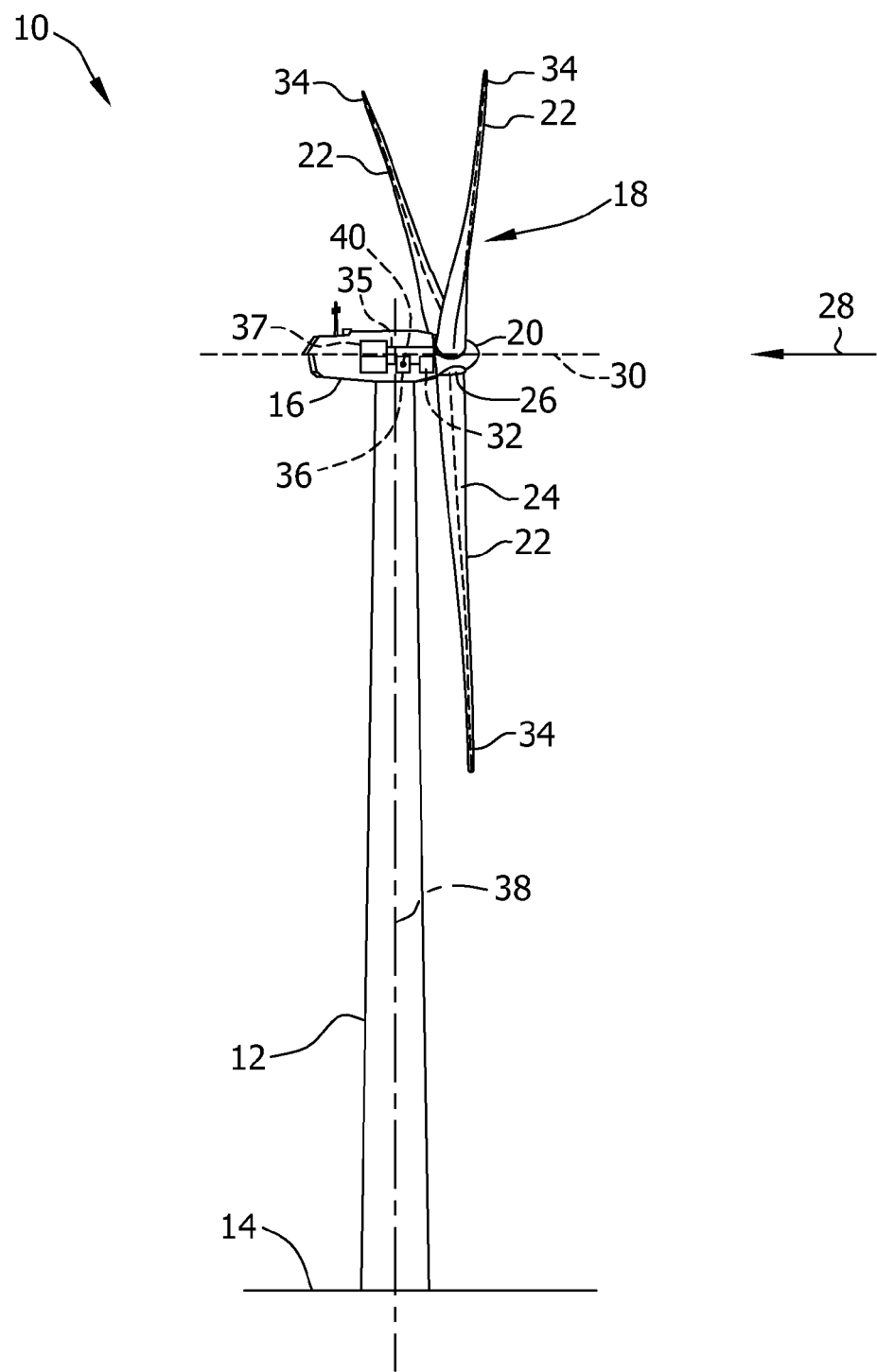
FIGS. 1-7 show exemplary embodiments of the systems and method described herein.

FIG. 1 is a perspective view of an exemplary wind turbine 10. In the exemplary embodiment, wind turbine 10 is a nearly horizontal-axis wind turbine. In an alternative embodiment, wind turbine 10 may have any suitable tilt angle that enables wind turbine 10 to function as described herein. Alternatively, wind turbine 10 may be a vertical axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 may be selected based upon factors and conditions known in the art.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

Rotor shaft 35 is coupled to rotor 18 and generator 37 and transfers mechanical rotational energy from rotor 18 to generator 37. Generator 37 converts the mechanical energy of rotor 18 to electrical energy used in power production of wind turbine 10. Generator 37 provides electrical power to control system 36, pitch adjustment system 32, and processor 40, including other functional systems of wind turbine 10 that require electrical power. In the exemplary embodiment, rotor shaft 35 and generator 37 are at least partially positioned within nacelle 16. In an alternative embodiment, a back-up supply of power (not shown) is also provided to supply electrical power to control system 36, pitch adjustment system 32, and/or processor 40 in the event generator 37 is not functioning to produce power sufficient to operate the systems. Back-up supply of power may be centralized within nacelle 16, or distributed throughout wind turbine 10, on supporting surface 14, within a wind farm, and/or at a remote control center.

In the exemplary embodiment, rotor blades 22 have a length ranging from about 30 meters (m) (99 feet(ft)) to about 120 m (394 ft). Alternatively, rotor blades 22 may have any suitable length that enables wind turbine 10 to function as described herein. For example, other non-limiting examples of blade lengths include 10 m or less, 20 m, and 37 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle of rotor blades 22, i.e., an angle that determines a perspective of rotor blades 22 with respect to a rotor plane, may be changed by pitch adjustment system 32 to control power generated by wind turbine 10 by adjusting an angular position of a profile of at least one rotor blade 22 relative to wind vectors. Pitch axes 34 for rotor blades 22 are illustrated. In the exemplary embodiment, a pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however control system 36 may be a distributed system throughout wind turbine 10, on supporting surface 14, within a wind farm, and/or at a remote control center. Control system 36 includes processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

Figure 2:
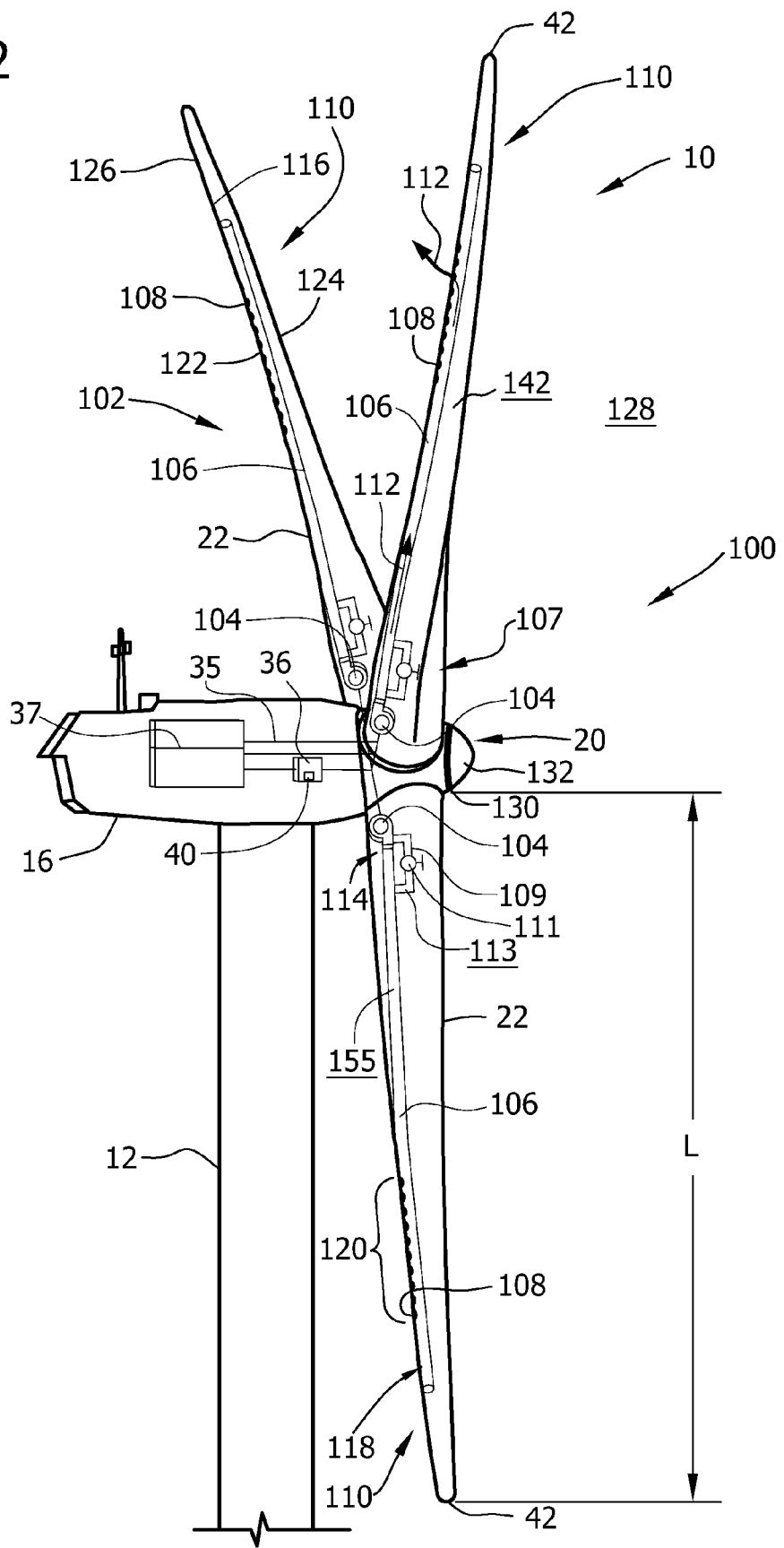
Figure 3:
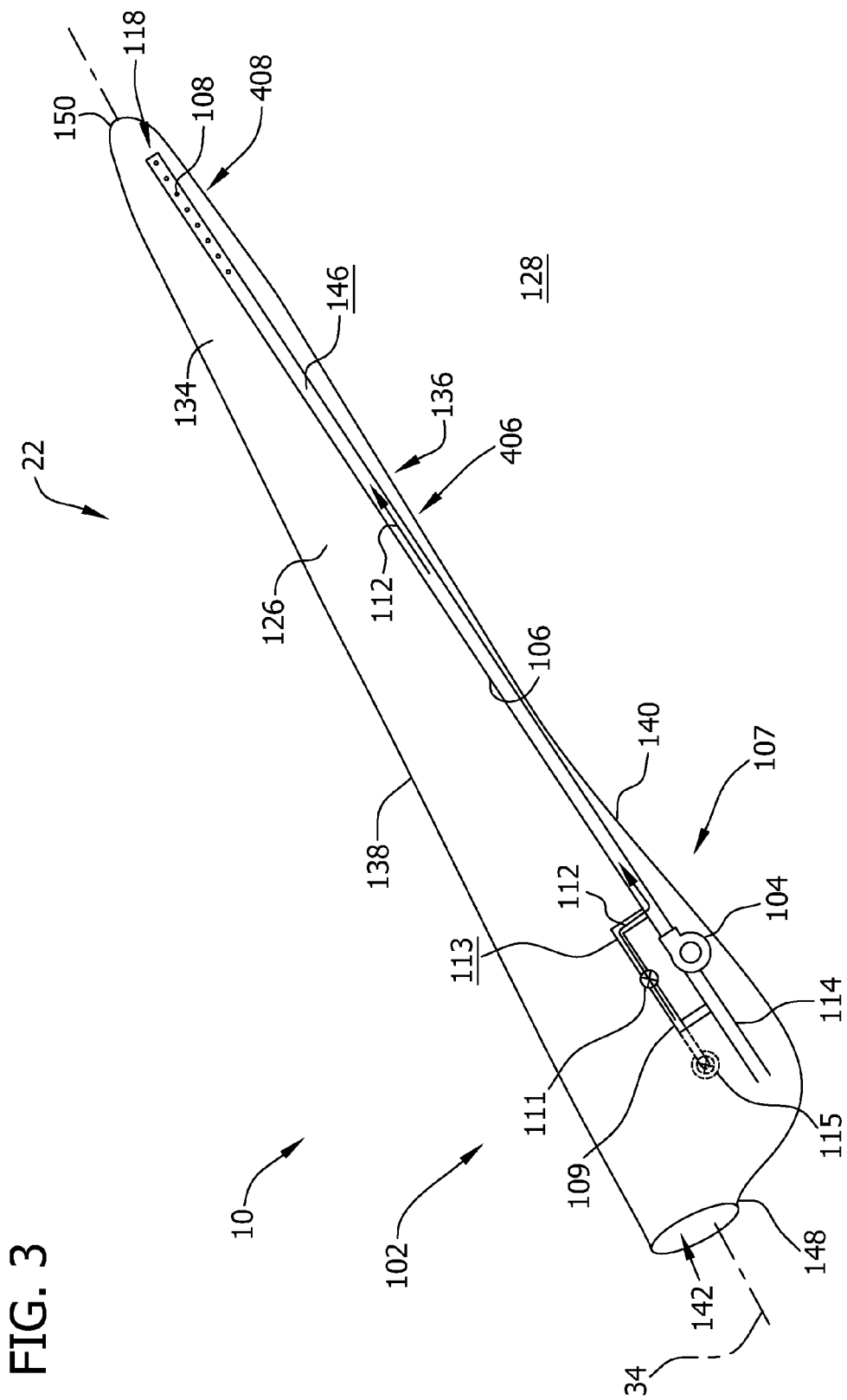

FIG. 2 is a schematic view of an exemplary flow control system 100 that may be used with wind turbine 10. FIG. 3 is a partial view of an exemplary air distribution system 102 suitable for use with wind turbine 10. Components shown in FIG. 1 are identified with similar reference numbers in FIG. 2 and FIG. 3. In the exemplary embodiment, flow control system 100 is a nonzero-net-mass flow control system that includes air distribution system 102. Control system 36 is considered to be a component of flow control system 100 and is in operational control communication with air distribution system 102. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

Referring to FIG. 2, air distribution system 102 includes at least one flow control device 104, at least one manifold 106, at least one bypass flow assembly 107, and one or more apertures 108. At least one flow control device 104, a respective manifold 106, a bypass flow assembly 107, and corresponding aperture 108 form an assembly 110. Each rotor blade 22 includes an assembly 110 at least partially defined therein. As such, air distribution system 102 includes a plurality of flow control devices 104, a plurality of manifolds 106, a plurality of bypass flow assemblies 107, and a plurality of apertures 108. Alternatively, at least one rotor blade 22 includes an assembly 110. In the exemplary embodiment, each assembly 110 is substantially similar, however, at least one assembly 110 may be different than at least one other assembly 110. Further, although in the exemplary embodiment, each assembly 110 includes a flow control device 104 and a bypass flow assembly 107, at least two assemblies 110 may share a common flow control device 104 and/or a common bypass flow assembly 107.

Flow control device 104 is, for example, a pump, a compressor, a fan, a blower, and/or any other suitable device for controlling a flow of a fluid. In one embodiment, flow control device 104 and/or assembly 110 includes a valve (not shown) that is configured to regulate a flow within air distribution system 102, such as a flow rate and/or a flow direction. In the exemplary embodiment, flow control device 104 is reversible for changing a direction of a fluid flow 112. Further, in the exemplary embodiment, air distribution system 102 includes one flow control device 104 for each rotor blade 22 of wind turbine 10, however, it should be understood that air distribution system 102 can include any suitable number of flow control devices 104. Control system 36 is operatively coupled to flow control device 104. Control system 36 is in operational control communication with each flow control device 104 for controlling fluid flows through air distribution system 102. Control system 36 may be directly coupled in operational control communication with each flow control device 104 and/or may be coupled in operational control communication with each flow control device 104 via a communication hub and/or any other suitable communication device(s).

Each flow control device 104 is in flow communication with at least one manifold 106. Flow control device 104 is operatively coupled to manifold 106 and flow control device 104 is configured to channel air into manifold 106. When one centralized flow control device 104 is used, flow control device 104 is in flow communication with each manifold 106 of air distribution system 102. In the exemplary embodiment, a flow control device 104 is coupled within respective rotor blade 22 at a root end 114 of each manifold 106. Alternatively, flow control device 104 may in any suitable positioned within wind turbine 10 and/or on supporting surface 14 (shown in FIG. 1) with respect to at least one manifold 106.

In the exemplary embodiment, each manifold 106 is at least partially defined within cavity 142 and along an interior surface 116 of respective rotor blade 22, and extends generally along a respective pitch axis 34 (shown in FIG. 1) from root end 114 of manifold 106 to an opposing tip end 118 of manifold 106. It should be understood that tip end 118 is not necessarily positioned within a tip 42 of rotor blade 22, but rather, is positioned nearer to tip 42 than manifold root end 114. A flow passage 155 is defined within manifold 106. In one embodiment, apertures 108 are defined at a predetermined portion 120 of a length L of rotor blade 22 from root end 114 within tip end 118. Further, it should be understood that manifold 106 may have any suitable configuration, cross-sectional shape, length, and/or dimensions that enables air distribution system 102 and/or flow control system 100 to function as described herein. It should also be understood that one or more components of blade 22 can be used to form manifold 106.

In the exemplary embodiment, air distribution system 102 also includes at least one bypass flow assembly 107. Bypass flow assembly 107 includes at least one bypass conduit 109, and at least on bypass valve 111. Each bypass flow assembly 107 is in flow communication with corresponding manifold 106. More specifically, each bypass flow assembly 107 is in flow communication with manifold 106 upstream and downstream of flow control device 104. In the exemplary embodiment, bypass conduit 109 is in flow communication with manifold 106 upstream of flow control device 104 and downstream of flow control device 104. Bypass conduit 109 defines flow passage 113. Bypass valve 111 is configured to regulate fluid flow through bypass conduit 109, bypassing flow control device 104. Control system 36 is in operational control communication with each bypass valve 111 for controlling fluid flow through bypass flow assembly 107. Control system 36 may be directly coupled in operational control communication with each bypass valve 111 and/or may be coupled in operational control communication with each bypass valve 111 via a communication hub and/or any other suitable communication device(s). In the exemplary embodiment, bypass flow assembly 107 is positioned near flow control device 104 near root end 114 of manifold 106, however, bypass flow assembly 107 may be positioned at any suitable position within wind turbine 10. Further, it should be understood that bypass flow assembly 107 may have any suitable configuration, cross-sectional shape, length, and/or dimensions that enables air distribution system 102 and/or flow control system 100 to function as described herein.

In the exemplary embodiment, air distribution system 102 also includes at least one aperture 108 providing flow communication between flow passage 155 defined through manifold 106 and ambient air 128. More specifically, in the exemplary embodiment, air distribution system 102 includes a plurality of apertures 108 defined along a suction side 122 of each respective rotor blade 22. Although apertures 108 are shown as being aligned in a line along suction side 122, it should be understood that apertures 108 may be positioned at any suitable location along suction side 122 of rotor blade 22 that enables flow control system 100 to function as described herein. Alternatively or additionally, apertures 108 are defined through a pressure side 124 of rotor blade 22. In the exemplary embodiment, apertures 108 are defined though an outer surface 126 of respective rotor blade 22 for providing flow communication between manifold 106 and ambient air 128.

Referring further to FIG. 2, flow control devices 104 are, in the exemplary embodiment, in flow communication with ambient air 128 via an opening 130 defined between hub 20 and a hub cover 132. Alternatively, wind turbine 10 does not include hub cover 132, and ambient air 128 is drawn into air distribution system 102 through an opening 130 near hub 20. In the exemplary embodiment, flow control devices 104 are configured to draw in ambient air 128 though opening 130 and to discharge fluid flow 112 generated from ambient air 128 into respective manifold 106. Alternatively, opening 130 may be defined at any suitable location within hub 20, nacelle 16, rotor blade 22, tower 12, and/or an auxiliary device (not shown) that enables air distribution system 102 to function as described herein. Further, air distribution system 102 may include more than one opening 130 for drawing air into air distribution system 102, such as including one or more openings 130 for each flow control device 104.

During a flow control operation, flow control system 100 is used to provide AFC for wind turbine 10. More specifically, control system 36 controls air distribution system 102 to draw in ambient air 128 and discharge a fluid flow 112 through at least one aperture 108. Operation of one assembly 110 will be described herein, however, it should be understood that each assembly 110 may function similarly. Further, assemblies 110 can be controlled to operate in substantial synchronicity or each assembly 110 may be controlled separately such that a fluid flow about each rotor blade 22 may be manipulated separately. When assemblies 110 are controlled in synchronicity, flow control system 100 can be controlled by control system 36 to maintain a predetermined load spectrum, power level, and/or noise level. In the exemplary embodiment, control system 36 instructs or controls flow control device 104 to draw in ambient air 128 to generate fluid flow 112 having one or more predetermined parameters, such as a velocity, a mass flow rate, a pressure, a temperature, and/or any suitable flow parameter. Flow control device 104 channels fluid flow 112 through manifold 106 from root end 114 to tip end 118. It should be understood that any suitable control methods and/or components, such as pitching rotor blade(s) 22, can alternatively or additionally be used to control a load spectrum, a power level, and/or a noise level of wind turbine 10. During normal operation of flow control device 104, bypass valve 111 restricts fluid flow through bypass flow assembly 107.

As fluid flow 112 is channeled through manifold 106, fluid flow 112 is discharged from air distribution system 102 through apertures 108. Discharged fluid flow 112 facilitates manipulating at least a boundary layer of a fluid flow across outer surface 126 of rotor blade 22. More specifically, discharging fluid flow 112 at suction side 122 of rotor blade 22 increases the lift across rotor blade 22, which increases the power generated by wind turbine 10. Alternatively, flow control device 104 may be operated to draw in ambient air 128 through aperture 108 into manifold 106 for discharge through opening 130 defined within hub 20 and/or any other suitable location. As such, ambient air 128 may be drawn in from the boundary layer to manipulate the boundary layer. During normal operation of flow control device 104, generator 37 provides power to operate flow control device 104. During periods when flow control device 104 is not operating due to a loss of power, control system 36 may operate air distribution system 102 by operating bypass valve 111 to allow fluid flow to enter manifold 106 through bypass flow assembly 107.

Referring now to FIG. 3, in the exemplary embodiment, air distribution system 102 is configured to increase a lift across rotor blade 22. Rotor blades 22 are identical and each includes a first sidewall 134 and an opposite second sidewall 136. Second sidewall 136 is coupled to first sidewall 134 along a leading edge 138 and along a trailing edge 140. First sidewall 134 and second sidewall 136 are coupled together to define cavity 142 between first sidewall 134 and second sidewall 136, respectively.

In one embodiment, air distribution system 102 is defined within rotor blade 22 and includes flow control device 104, manifold 106, bypass flow assembly 107, and at least one aperture 108. Manifold 106 is defined within a respective rotor blade 22 and extends generally along a respective pitch axis 34 from blade root 148 towards blade tip 150, and defines manifold passage 146. In the exemplary embodiment, manifold 106 is positioned aft of the chordwise location of maximum airfoil thickness of rotor blade 22. Flow control device 104 is in flow communication with manifold 106 and is positioned at or near root end 114 of manifold 106. A plurality of apertures 108 are positioned aft of the chordwise location of maximum airfoil thickness of rotor blade 22 and are defined through manifold 106 and outer surface 126 to provide flow communication between respective manifold 106 and ambient air 128. Bypass flow assembly 107 is defined within rotor blade 22 and includes bypass valve 111 in flow communication with bypass conduit 109. Bypass valve 111 is operatively coupled to bypass conduit 109 and is movable between a first, or closed, position and a second, or open position, wherein the first position prevents a flow of air through bypass conduit 109 and the second position allows air to flow through bypass conduit 109 to manifold passage 146. In the exemplary embodiment, bypass conduit 109 is coupled to manifold 106 upstream of flow control device 104 and downstream of flow control device 104. Flow passage 113 provides flow communication between an air supply and manifold passage 146, such that bypass flow assembly 107 is in flow communication with manifold 106, wherein fluid flow 112 can circumvent flow control device 104 and be conveyed through manifold 106 and discharged through apertures 108. Bypass flow assembly 107 is operatively coupled to manifold 106 and configured to channel air through air distribution system 102 with flow control device 104 in a non-operating configuration. In an alternative embodiment, bypass conduit 109 is in flow communication with an inlet opening 115 defined within outer surface 126, wherein inlet opening 115 is positioned near blade root 148.

During operation of wind turbine 10, the rotation of rotor blade 22 and rotor 18 (shown in FIG. 1) about axis 30 (shown in FIG. 1) of wind turbine 10 generates a centrifugal force within rotor blade 22 that acts on the fluid flow 112 such that fluid flow 112 is forced in an outward radial direction from opening 130 (shown in FIG. 2) towards tip 42 of rotor blade 22. As the centrifugal force of rotor blade 22 acts upon fluid flow 112, a differential pressure is created between ambient air 128 and fluid flow 112 such that fluid flow 112 is discharged through apertures 108. Bypass flow assembly 107 is configured to allow the centrifugal force to move air through air distribution system 102.

Figure 4:
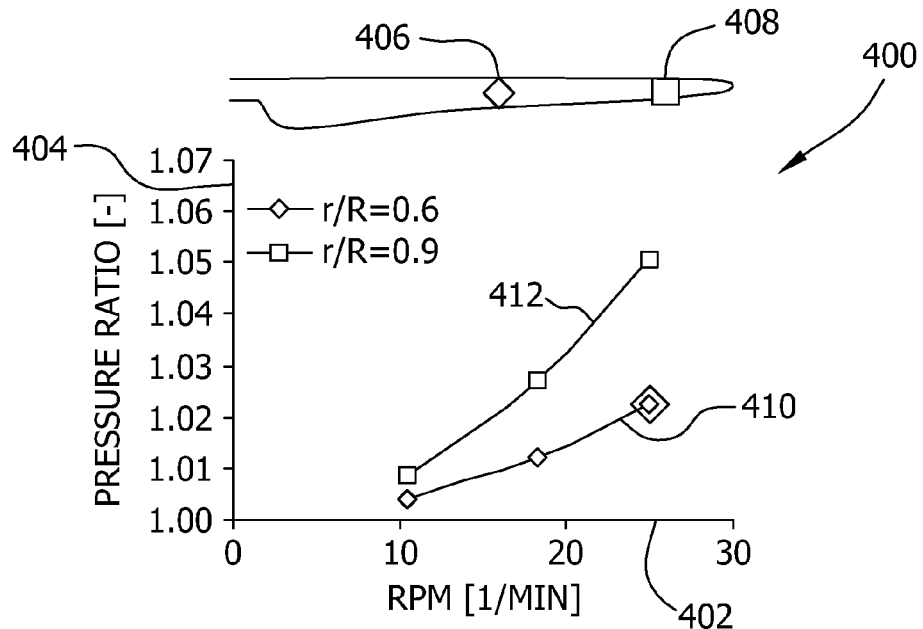

FIG. 4 is a graph 400 of exemplary traces of the pressure ratio of fluid flow 112 to ambient air 128, created by the centrifugal forces generated by the rotation of rotor blade 22 as measured from a point 406 (shown in FIG. 3) near a midspan of rotor blade 22 and a point 408 (shown in FIG. 3) near blade tip 150. The x-axis 402 displays a speed of the rotation of rotor blade 22 measured in revolutions per minute (RPM). The y-axis 404 displays a pressure ratio, $P_r$, of fluid flow 112 over ambient air 128. In the exemplary embodiment, rotor blade 22 has a length of 77 meters, and includes a rotational speed of about 10 RPM at a wind velocity of 5 meters per second (m/s) and a rotational speed of about 18 RPM at a wind velocity of 9 m/s. Trace 410 represents the pressure ratio available at mid-span point 406 as a function of a given rotational speed. Trace 412 represents the pressure ratio available at point 408 as a function of a given rotational speed. In the exemplary embodiment, at a rotational speed of about 18 RPM, the pressure ratio of fluid flow 112 to ambient air 128 is near 1.03 at point 408, and near 1.01 at point 406.

Figure 5:
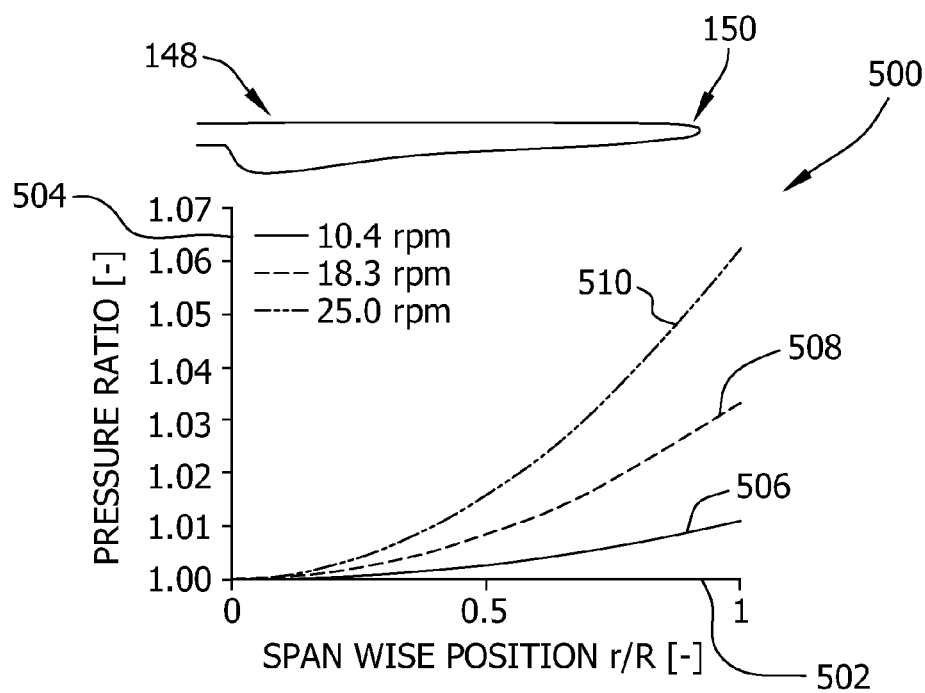

FIG. 5 is a graph 500 of exemplary traces of pressure ratio, $P_r$, versus a span wise position along the axis 34 of rotor blade 22. The x-axis 502 displays the span wise position along the axis 34 of rotor blade 22 as measured from the blade root 148 to the blade tip 150. The y-axis 504 displays a pressure ratio, $P_r$, of fluid flow 112 over ambient air 128. Traces 506, 508, and 510 represent the pressure ratio available for a rotor blade 22 with a rotational speed of 10.4, 18.3, and 25 RPM, respectively. During events where rotor blade 22 experiences rotational speeds of 18.3 RPM, the pressure ratio available at or near blade tip 150 of rotor blade 22 is near 1.03.

In the exemplary embodiment, sufficient centrifugal force is generated by the rotation of rotor blade 22 about axis 30, such that a differential pressure, Pr, is created within rotor blade 22 that is sufficient to discharge fluid flow 112 through apertures 108. When flow control device 104 is not operating due to malfunction or power loss to flow control device 104, control system 36 operates bypass valve 111 to pass fluid flow 112 through bypass flow assembly 107 and into manifold 106. The centrifugal force generated by the rotation of rotor blade 22 will act outwardly against fluid flow 112 to create a differential pressure such that fluid flow 112 overcomes the pressure in ambient air 128 and is discharged through apertures 108, thereby extending the lift assistance provided by air distribution system 102. As used herein, "headloss" is defined as a loss of fluid pressure due to friction forces imparted on a fluid as the fluid passes through a device. As fluid flow 112 passes through flow control device 104, fluid flow 112 experiences headloss due to friction forces imparted on fluid flow 112 from flow control device 104. The loss of fluid pressure due to headloss results in reduced energy available in fluid flow 112 to channel through manifold 106 and discharge through aperture 108, resulting in a decrease in differential pressure between fluid flow 112 and ambient air 128. Bypass flow assembly 107 is configured to reduce the friction forces imparted on fluid flow 112 by channeling fluid flow 112 around flow control device 104, and therefore reduce the headloss experience by fluid flow 112 as fluid flow 112 is channeled through bypass flow assembly 107 and into manifold 106.

Figure 6:
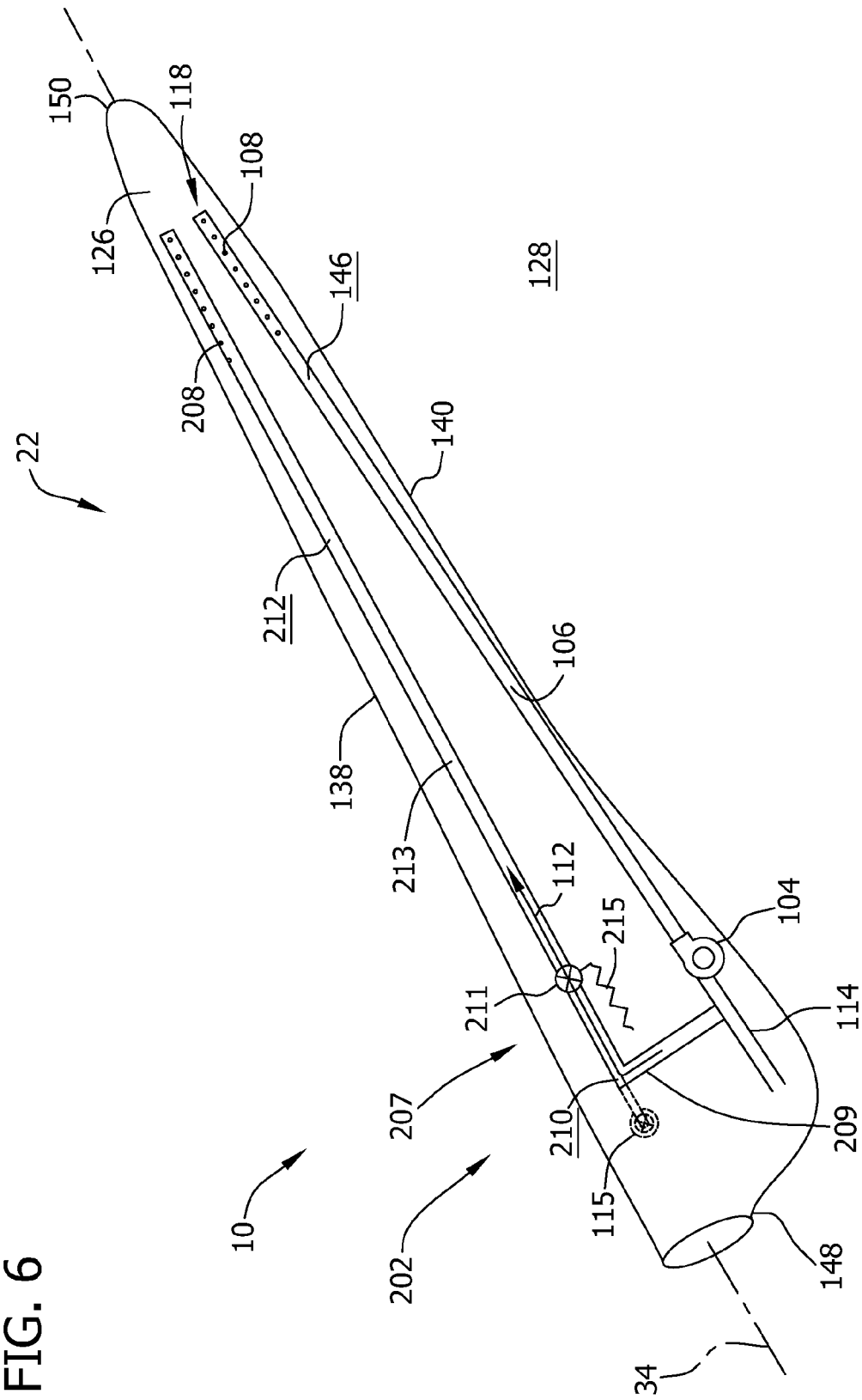

FIG. 6 is a cross-sectional view of an alternative embodiment of air distribution system 202 that may be used with wind turbine 10. Components shown in FIGS. 2 and 3 are identified with similar reference numbers in FIG. 6. In this alternative embodiment, air distributions system 202 includes a bypass flow assembly 207 that is configured to decrease the lift across rotor blade 22. Air distribution system 202 is defined within rotor blade 22 and includes flow control device 104, a manifold 106, bypass flow assembly 207, and at least one aperture 108 defined through outer surface 126 to provide flow communication between respective manifold 106 and ambient air 128. Manifold 106 is defined within a respective rotor blade 22 and extends generally along a respective pitch axis 34 from blade root 148 towards blade tip 150. In the exemplary embodiment, manifold 106 is positioned aft of the chordwise location of maximum airfoil thickness of rotor blade 22. Flow control device 104 is in flow communication with manifold 106 and is positioned at or near root end 114 of manifold 106. A plurality of apertures 108 are positioned at or near trailing edge 140 and are defined through outer surface 126 to provide flow communication between respective manifold 106 and ambient air 128. In this alternative embodiment, bypass flow assembly 207 includes a bypass conduit 209, a bypass valve 211, a second manifold 213, a biasing member 215, and a plurality of second apertures 208.

Second manifold 213 is positioned within respective rotor blade 22 and extends parallel to manifold 106 from blade root 148 to blade tip 150 to define second manifold passage 212. Second manifold 213 is positioned proximate to leading edge 138 of rotor blade 22. As used herein, the term "proximate" is defined as at or near. Second apertures 208 are positioned proximate leading edge 138 and are defined through outer surface 126 to provide flow communication between second manifold 213 and ambient air 128. Bypass flow assembly 207 includes bypass valve 211 in flow communication with bypass conduit 209 and second manifold 213. Bypass valve 211 is operatively coupled to bypass conduit 209 and is movable between a first, or closed, position and a second, or open position, wherein the first position prevents a flow of air through bypass conduit 209 and the second position allows air to flow through bypass conduit 209 to second manifold passage 212. In this alternative embodiment, bypass conduit 209 is coupled to manifold 106 upstream of flow control device 104 and defines a passage 210. Bypass flow assembly 207 is in flow communication with manifold 106 such that fluid flow 112 can circumvent flow control device 104 and be channeled through passage 210 to second manifold passage 212 and discharged through second apertures 208. In an alternative embodiment, bypass conduit 209 is in flow communication with an inlet opening 115 defined within outer surface 126, wherein inlet opening 115 is positioned near blade root 148.

Biasing member 215 is operatively coupled to bypass valve 211. During normal operation of wind turbine 10, biasing member 215 acts upon bypass valve 211 to retain bypass valve 211 in a closed position, thereby preventing fluid flow 112 from entering second manifold 213. When rotor blade 22 reaches an overspeed condition, biasing member 215 reacts to move bypass valve 211 from a closed position to an open position to allow fluid flow 112 to be channeled through second manifold 213 and discharged towards leading edge 138 of rotor blade 22 through second apertures 208, thereby reducing the lift across rotor blade 22 resulting in a reduction in rotational speed. During an overspeed event, control system 36 will operationally control flow control device 104 to restrict fluid flow through manifold 106.

Figure 7:
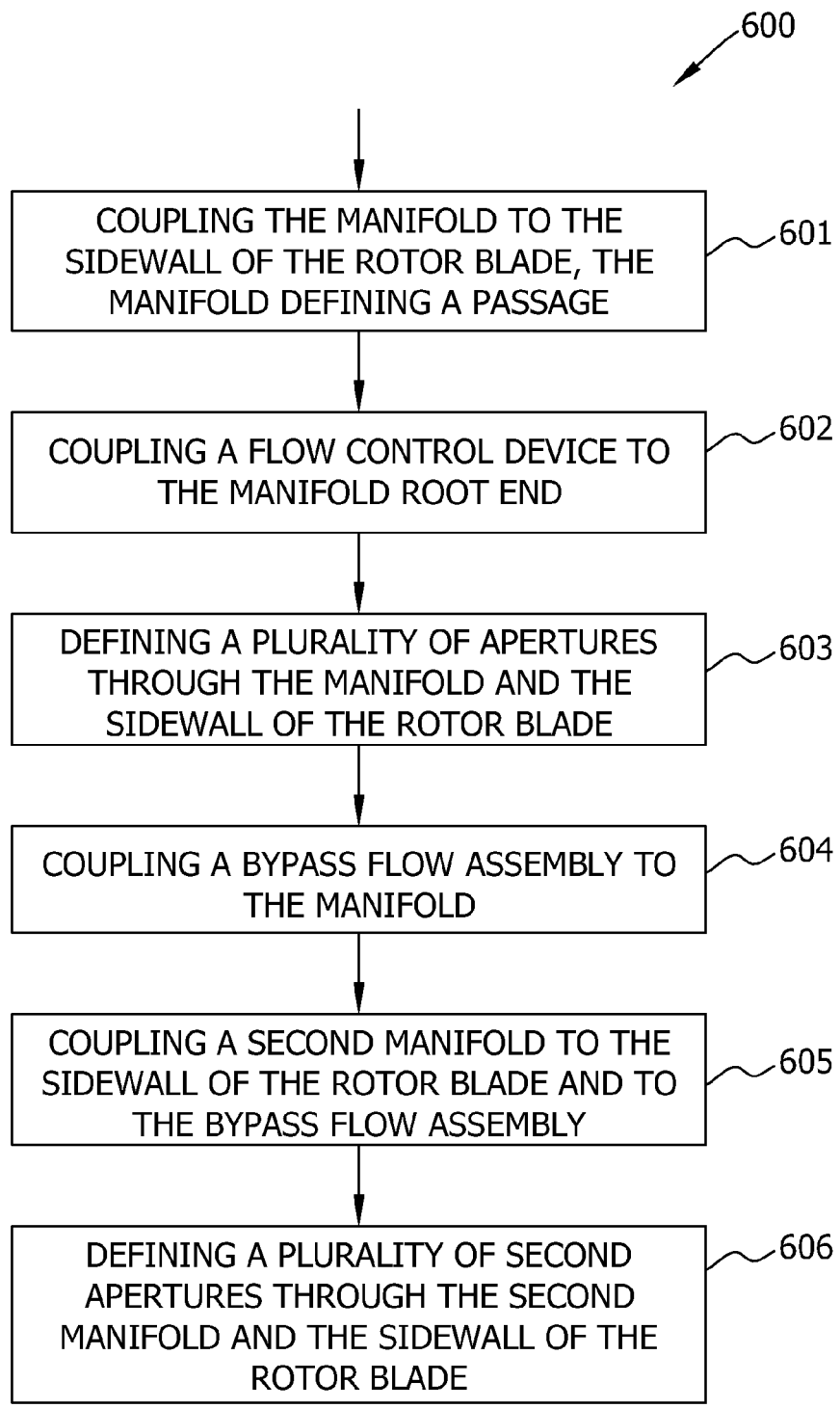

FIG. 7 is a flow chart illustrating an exemplary method 600 for assembling air distribution system 102 suitable for use in rotor blade 22 of wind turbine 10. In the exemplary embodiment Method 600 includes coupling 601 manifold 106 to sidewall 134 of rotor blade 22, coupling 602 flow control device 104 to manifold root end 114, defining 603 a plurality of apertures 108 through sidewall 134 of rotor blade 22, and coupling 604 bypass flow assembly 107 to tip end 118 of manifold 106. In an alternative embodiment, Method 600 further includes coupling 605 second manifold 213 to sidewall 134 of rotor blade 22 and to bypass flow assembly 107, and defining 606 a plurality of second apertures 208 through second manifold 213 and sidewall 134 proximate leading edge 138 such that plurality of second apertures 208 provides flow communication between second manifold passage 212 and ambient air 128.

The above-described systems and methods facilitate operating an active flow control system during periods of electrical power loss. As such, the embodiments described herein facilitate wide-spread use of active flow control in, for example, wind turbine applications. The above-described systems provide for operation of an AFC system without electrical power by using the centrifugal force generated by the rotation of the wind turbine blade to discharge air through the AFC system. As such, the loss in power production due to a non-functioning AFC system is reduced. Further, the system described herein facilitates operation of the AFC system during periods of blade overspeed, thereby reducing the potential for damage to the blade.

Exemplary embodiments of systems and methods for assembling an air distribution system for use in a rotor blade of a wind turbine are described above in detail. The systems and methods are not limited to the specific embodiments described herein, but rather, components of the systems and/or steps of the methods may be utilized independently and separately from other components and/or steps described herein. For example, the methods may also be used in combination with other active flow control systems, and are not limited to practice with only the wind turbine systems as described herein. Rather, the exemplary embodiment can be implemented and utilized in connection with many other blade lift enhancement applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an air distribution system for use in a rotor blade of a wind turbine, the rotor blade including a sidewall at least partially defining a cavity extending from a blade root towards a blade tip, said method comprising:
   coupling a manifold to the sidewall, the manifold extending from the blade root towards the blade tip, the manifold having a root end and an opposing tip end, and defining a passage from the root end to the tip end;
   coupling a flow control device to the manifold root end, the flow control device configured to channel air through the manifold;
   defining a plurality of apertures through the manifold and the sidewall, the plurality of apertures providing flow communication between the passage and ambient air; and,
   coupling a bypass flow assembly to the manifold, the bypass flow assembly configured to channel air through the air distribution system with the flow control device in a non-operating configuration.

2. A method in accordance with claim 1, wherein the air distribution system includes an air supply, and the bypass flow assembly includes a bypass conduit having a root end and an opposing tip end and defining a passage from the root end to the tip end, the method further comprising:
   coupling a bypass conduit to the air supply, the bypass conduit at least partially defining a passage;
   operatively coupling a bypass valve to the bypass conduit, the bypass valve movable between a first position and a second position, the bypass conduit configured to channel air to the bypass valve; and,
   coupling the bypass conduit tip end to the manifold, the bypass conduit tip end coupled at a location along an axis of the manifold that is downstream of the flow control device.

3. A method in accordance with claim 1, wherein the rotor blade has a leading edge and a trailing edge, the method further comprising:
   coupling a second manifold to the sidewall, the second manifold positioned within the cavity along the leading edge and extending from the blade root towards the blade tip, the second manifold having a root end and an opposing tip end, and defining a passage from the root end to the tip end;
   coupling the second manifold root end to the bypass flow assembly, the bypass flow assembly configured to channel air through the second manifold; and,
   defining a plurality of second apertures through the second manifold and the sidewall proximate the leading edge, the plurality of second apertures providing flow communication between the second manifold passage and ambient air.

4. An air distribution system for use in a wind turbine, the wind turbine including a rotor blade having a sidewall at least partially defining a cavity extending from a blade root towards a blade tip of the rotor blade, the air distribution system comprising:
   a manifold at least partially positioned within the cavity and extending from the blade root towards the blade tip, the manifold having a root end and an opposing tip end, and defining a passage from the root end to the tip end;
   a flow control device operatively coupled to the manifold and configured to channel air into the manifold;
   a plurality of apertures defined through the manifold and the sidewall, the plurality of apertures providing flow communication between the passage and ambient air; and,
   a bypass flow assembly operatively coupled to the manifold, the bypass flow assembly configured to channel air through the air distribution system with the flow control device in a non-operating configuration.

5. An air distribution system in accordance with claim 4, wherein with the rotor blade generating a centrifugal force during rotation of the rotor blade, the bypass flow assembly is configured to allow the centrifugal force to move air through the air distribution system.

6. An air distribution system in accordance with claim 5, wherein the bypass flow assembly is configured to reduce headloss in the air distribution system.

7. An air distribution system in accordance with claim 4, wherein the bypass flow assembly further comprises a bypass conduit defining a passage providing flow communication between an air supply and the manifold passage.

8. An air distribution system in accordance with claim 7, wherein the bypass flow assembly further comprises a bypass valve operatively coupled to the bypass conduit, the bypass valve movable between a first position to prevent the flow of air into the manifold passage and a second position to allow air to flow into the manifold passage.

9. An air distribution system in accordance with claim 4, wherein the air distribution system further comprises an opening defined through the sidewall, the opening configured to channel ambient air into the bypass flow assembly.

10. An air distribution system in accordance with claim 4, wherein the rotor blade has a leading edge and a trailing edge, the air distribution system further comprises:
    a second manifold positioned within the cavity along the leading edge and extending from the blade root towards the blade tip, the second manifold having a root end and an opposing tip end, and defining a passage from the root end to the tip end, the second manifold root end coupled to the bypass flow assembly, and the bypass flow assembly configured to channel air through the second manifold; and, a plurality of second apertures defined through the second manifold and the sidewall proximate the leading edge, the plurality of second apertures providing flow communication between the second manifold passage and ambient air.

11. An air distribution system in accordance with claim 10, wherein the air distribution system includes an air supply, the bypass flow assembly further comprises a bypass conduit at least partially defining a passage, the bypass conduit coupled to the air supply and configured to provide flow communication between the air supply and the second manifold passage.

12. An air distribution system in accordance with claim 11, wherein the bypass flow assembly further comprises a bypass valve coupled to the bypass conduit, the bypass valve movable between a first position to prevent the flow of air into the manifold passage and a second position to allow air to flow into the second manifold passage.

13. An air distribution system in accordance with claim 12, wherein the bypass valve is configured to move to the second position during rotor blade overspeed, the bypass flow assembly further comprises a biasing member operatively coupled to the bypass valve, the biasing member configured to bias the bypass valve to the first position and release the bypass valve to the second position when the rotation of the rotor blade has reached overspeed.

14. An air distribution system in accordance with claim 10, wherein the air distribution system further comprises an inlet opening defined within the sidewall, said second manifold coupled in flow communication with said inlet opening.

15. A wind turbine, comprising:
  at least one rotor blade, the rotor blade including a sidewall at least partially defining a cavity extending from a blade root towards a blade tip; and,
  an air distribution system at least partially positioned within the cavity, the air distribution system comprising:
    a manifold at least partially positioned within the cavity and extending from the blade root towards the blade tip, the manifold having a root end and an opposing tip end, and defining a passage from the root end to the tip end;
    a flow control device operatively coupled to the manifold and configured to channel air into the manifold;
    a plurality of apertures defined through the manifold and the sidewall, the plurality of apertures providing flow communication between the passage and ambient air; and,
    a bypass flow assembly operatively coupled to the manifold, the bypass flow assembly configured to channel air through the air distribution system with the flow control device in a non-operating configuration.

16. A wind turbine in accordance with claim 15, wherein the bypass flow assembly further comprises a bypass conduit defining a passage providing flow communication between an air supply and the manifold passage.

17. A wind turbine in accordance with claim 16, wherein the bypass flow assembly further comprises a bypass valve operatively coupled to the bypass conduit, the bypass valve movable between a first position to prevent the flow of air into the manifold passage and a second position to allow air to flow into the manifold passage.

18. A wind turbine in accordance with claim 15, wherein the rotor blade has a leading edge and a trailing edge, the air distribution system further comprises:
  a second manifold positioned within the cavity along the leading edge and extending from the blade root towards the blade tip, the second manifold having a root end and an opposing tip end, and defining a passage from the root end to the tip end, the second manifold root end coupled to the bypass flow assembly, and the bypass flow assembly configured to channel air through the second manifold; and,
  a plurality of second apertures defined through the second manifold and the sidewall proximate the leading edge, the plurality of second apertures providing flow communication between the second manifold passage and ambient air.

19. A wind turbine in accordance with claim 18, wherein the bypass flow assembly further comprises a bypass conduit at least partially defining a passage, the bypass conduit coupled to an air supply to provide flow communication between the air supply and the second manifold passage.

20. A wind turbine in accordance with claim 19, wherein the bypass flow assembly further comprises a bypass valve coupled to the bypass conduit, the bypass valve providing flow communication between the bypass conduit passage and the second manifold passage, the bypass valve movable between a first position to prevent the flow of air into the second manifold passage and a second position to allow air to flow into the second manifold passage.

21. A wind turbine in accordance with claim 20, wherein the bypass valve is configured to move to the second position during rotor blade overspeed, the bypass flow assembly further comprises a biasing member operatively coupled to the bypass valve, the biasing member configured to bias the bypass valve to the first position and release the bypass valve to the second position when the rotation of the rotor blade has reached overspeed.

* * * * *